United States Patent
Yoon

(10) Patent No.: US 10,599,215 B2
(45) Date of Patent: Mar. 24, 2020

(54) OFF-AXIS EYE TRACKER

(71) Applicant: Facebook Technologies, LLC, Menlo Park, CA (US)

(72) Inventor: Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 506 days.

(21) Appl. No.: 15/139,029

(22) Filed: Apr. 26, 2016

(65) Prior Publication Data

US 2017/0308160 A1 Oct. 26, 2017

(51) Int. Cl.
*G06F 3/01* (2006.01)
*G02B 27/01* (2006.01)
*G02B 27/00* (2006.01)

(52) U.S. Cl.
CPC ......... *G06F 3/013* (2013.01); *G02B 27/0093* (2013.01); *G02B 27/0172* (2013.01); *G06F 3/012* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| | | | | |
|---|---|---|---|---|
| 4,287,410 A * | 9/1981 | Crane | ..................... | A61B 3/113 250/201.4 |
| 4,743,932 A * | 5/1988 | Matsui | ............... | G02B 27/0018 396/114 |
| 5,036,347 A * | 7/1991 | Tsunekawa | ............ | A61B 3/112 396/121 |
| 5,200,861 A * | 4/1993 | Moskovich | ............ | G02B 13/18 359/662 |
| 5,293,535 A * | 3/1994 | Sensui | ................... | G03B 13/06 396/384 |
| 5,541,701 A * | 7/1996 | Sensui | ................... | A61B 3/113 396/373 |
| 5,689,736 A * | 11/1997 | Okuyama | .............. | G03B 13/06 250/221 |
| 6,018,630 A * | 1/2000 | Arai | ....................... | G03B 13/02 396/51 |
| 6,161,932 A * | 12/2000 | Goto | ........................ | A61F 4/00 351/208 |
| 9,720,232 B2 * | 8/2017 | Hua | ........................ | G06F 3/013 |
| 2014/0071400 A1 * | 3/2014 | Gao | ........................ | A61B 3/113 351/210 |
| 2015/0241755 A1 * | 8/2015 | Cleveland | ................ | G03B 9/02 396/199 |
| 2017/0140224 A1 * | 5/2017 | Wilson | ............... | G02B 27/0093 |

* cited by examiner

*Primary Examiner* — Dorothy Harris
(74) *Attorney, Agent, or Firm* — Morgan, Lewis & Bockius LLP

(57) ABSTRACT

A display device includes a two-dimensional array of pixels configured for outputting a respective pattern of light. The two-dimensional array of pixels defines an optical axis. The display device also includes an eye tracker that includes a first reflector positioned to intersect the optical axis; a first lens that is located off the optical axis; and an optical sensor configured to collect light, that is from the first reflector and has passed through the first lens, for determining a position of an eye of a user.

19 Claims, 8 Drawing Sheets

OFF-AXIS EYE TRACKER

TECHNICAL FIELD

This relates generally to display devices, and more specifically to head-mounted display devices.

BACKGROUND

Head-mounted display devices (also called herein head-mounted displays) are gaining popularity as means for providing visual information to user. However, the size and the weight of conventional head-mounted displays have limited applications of head-mounted displays.

SUMMARY

Accordingly, there is a need for head-mounted displays that are compact and light, thereby enhancing the user's virtual-reality and/or augmented reality experience. In addition, the head-mounted displays should be low power, to ensure a long battery life.

In particular, eye-tracking is important in providing virtual-reality and/or augmented reality experience, because images (or media) presented by the head-mounted displays are selected based on a position of an eye. For example, when an eye of a user rolls left, an image that corresponds to the left side of the user is displayed and when the eye rolls right, an image that corresponds to the right side of the user is displayed, thereby providing a visual feedback that mimics a real world environment. However, conventional eye trackers (also called herein eye tracking devices) are bulky, partly because conventional eye trackers require a certain distance for optics to work. Furthermore, distortions associated with conventional eye trackers lead to errors in measuring eye positions.

The above deficiencies and other problems associated with conventional head-mounted displays are reduced or eliminated by the disclosed display devices. In some embodiments, the device is a head-mounted display device. In some embodiments, the device is portable.

In accordance with some embodiments, a display device includes a two-dimensional array of pixels configured for outputting a respective pattern of light. The two-dimensional array of pixels defines an optical axis. The display device also includes an eye tracker that includes: a first reflector positioned to intersect the optical axis; a first lens that is located off the optical axis; and an optical sensor configured to collect light, that is from the first reflector and has passed through the first lens, for determining a position of an eye of a user.

In accordance with some embodiments, a method is performed at a display device that comprises a two-dimensional array of pixels and an eye tracker. The eye tracker includes a lens that defines a first optical axis and the first optical axis is parallel to, and distinct from, a second optical axis defined by the two-dimensional array of pixels. The method includes receiving light that is from the reflector and has passed through the lens; and determining a position of an eye of a user from the received light.

In accordance with some embodiments, a computer readable storage medium stores one or more programs for execution by one or more processors of a display device with a two-dimensional array of pixels and an eye tracker. The eye tracker includes a lens that defines a first optical axis. The first optical axis is parallel to, and distinct from, a second optical axis defined by the two-dimensional array of pixels. The one or more programs including instructions for: receiving light that is from the reflector and has passed through the lens; and determining a position of an eye of a user from the received light.

Thus, the disclosed embodiments provide compact and light display devices with increased efficiency, effectiveness, and user satisfaction with such devices.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
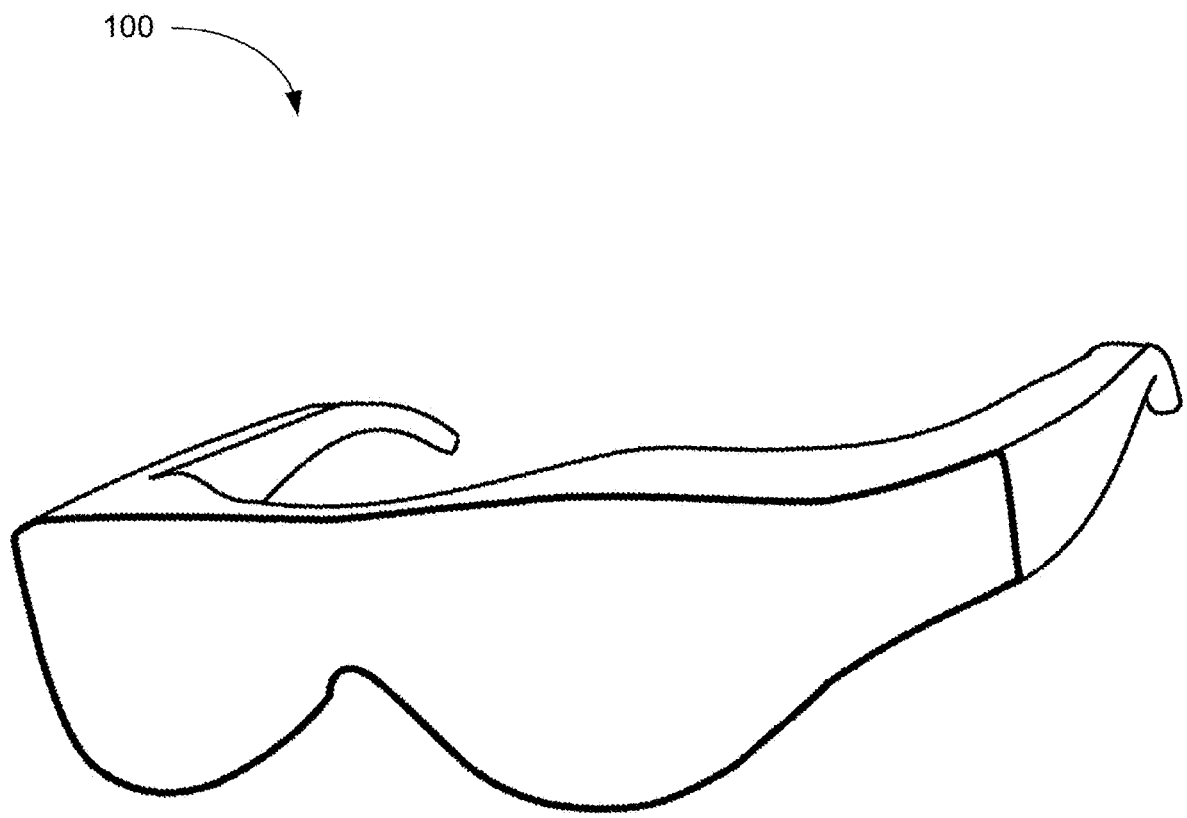
FIG. 1 is a perspective view of a display device in accordance with some embodiments.

These figures are not drawn to scale unless indicated otherwise.

DETAILED DESCRIPTION

Conventional head-mounted displays are larger and heavier than typical eyeglasses, because conventional head-mounted displays often include a complex set of optics that can be bulky and heavy. It is not easy for users to get used to wearing such large and heavy head-mounted displays. One of the components in head-mounted displays is an eye tracker, which plays an important role in determining positions of an eye. Projecting images based on the positions of the eye (e.g., projecting an image of a ceiling when the eye rolls up and projecting an image of a floor when the eye rolls down) improves the user experience with the provided virtual reality or augmented reality environment.

The disclosed embodiments, by utilizing off-axis optics, provide an eye tracker that is compact and light, which in turn reduces the size and the weight of display devices (including those that can be head-mounted). In some embodiments, aberrations associated with off-axis optics are at least partially corrected by using one or more non-spherical lenses.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
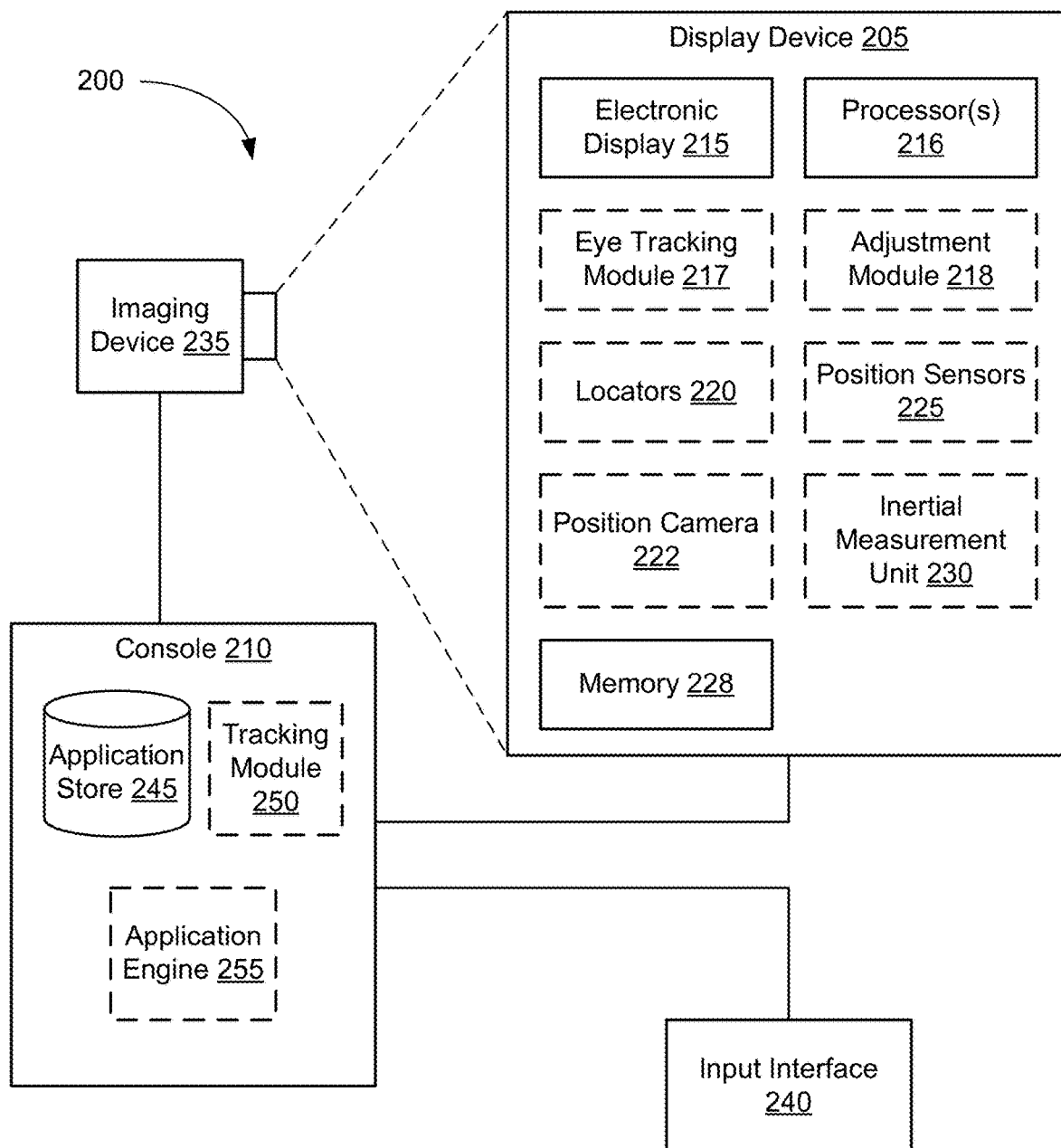
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores the following programs, modules and data structures, or a subset or superset thereof:

instructions for receiving light that is from the reflector and has passed through the lens (e.g., instructions for activating one or more sensors to receive light and convert the light into electrical signals); and instructions for determining a position of an eye of a user from the received light (e.g., instructions for determining the position of the eye based on an intensity profile of retro-reflected light).

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user). The adjustable electronic display element may be flat, cylindrically curved, or have some other shape.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from their retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image—and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, adjustment module 218 adjusts an output (i.e. the generated image frame) of electronic display 215 based on the detected locations of the pupils. In some embodiments, adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses, or some combination thereof.

In some embodiments, adjustment module 218 is configured to instruct the display elements to not use every pixel (e.g., one or more light emission devices), such that black spaces aperture the diverging light to abut the image together from the retinal perspective. In addition, in some embodiments, gaps are created between the pixel groups to match divergence of the light source array and the magnification of the group of pixels as it transverses through the optical system and fully fills the lenslet. In some embodiments, adjustment module 218 determines, for a given position of an eye, which pixels are turned on and which pixels are turned off—with the resulting image being projected on the eye's retina.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates fast calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates fast calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the fast calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Slow calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, generates content for presentation to the user. Content generated by an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using slow calibration information from imaging device 235. For example, tracking module 250 determines positions of a reference point of display device 205 using observed locators from the slow calibration information and a model of display device 205. In some embodiments, tracking module 250 also determines positions of a reference point of display device 205 using position information from the fast calibration information. Additionally, in some embodiments, tracking module 250 may use portions of the fast calibration information, the slow calibration information, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
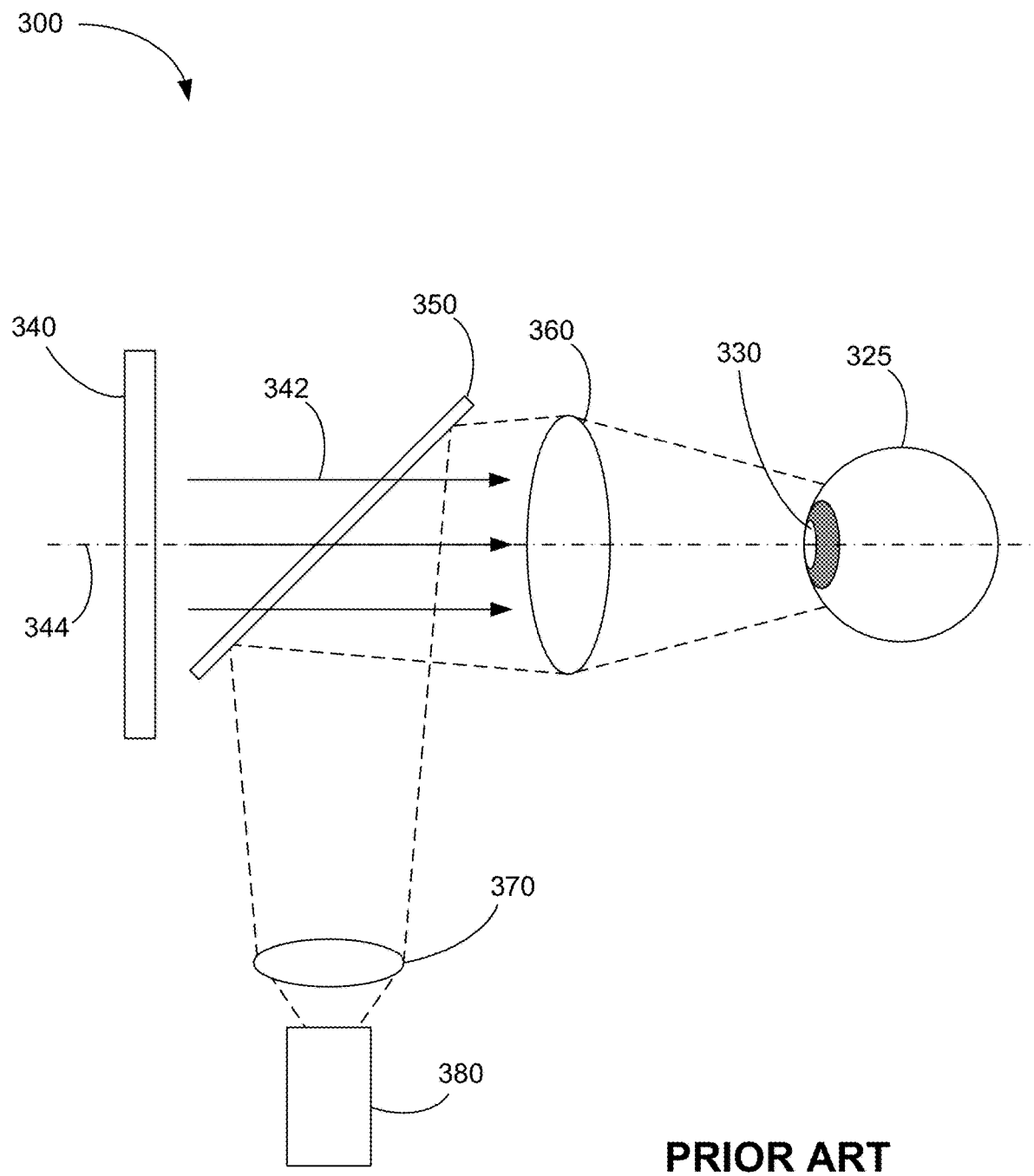
FIGS. 3A and 3B are schematic diagrams illustrating examples of conventional eye trackers.
Figure 3B:
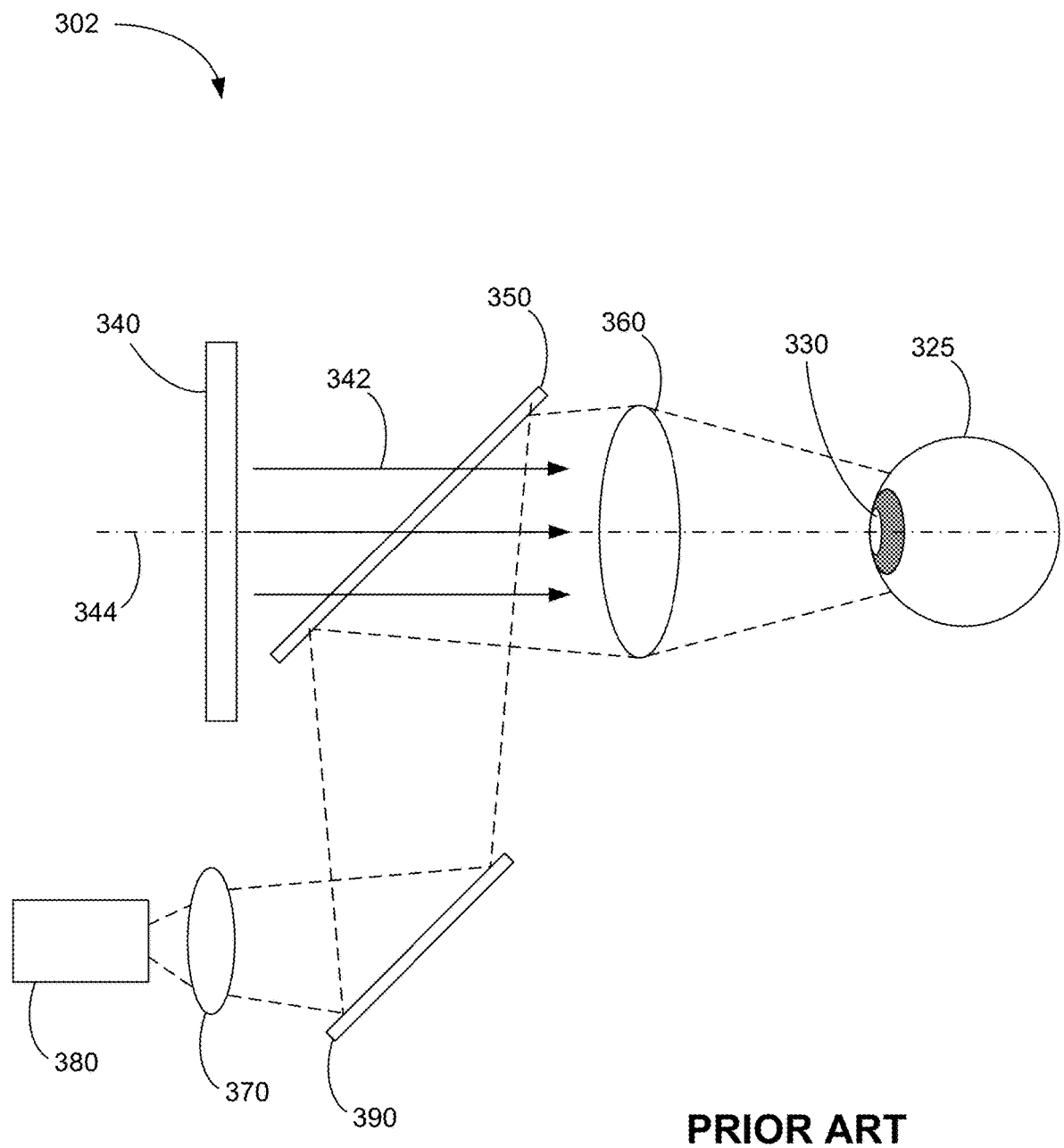

FIGS. 3A and 3B are schematic diagrams illustrating examples of conventional eye trackers.

In FIG. 3A, display device 300 includes two-dimensional array 340 of pixels (e.g., a liquid crystal display). Eye 325 of a user (which is not part of display device 300) is positioned in front of two-dimensional array 340 of pixels (e.g., a liquid crystal display) for viewing an image displayed on two-dimensional array 340 of pixels. In some embodiments, one or more lenses (e.g., lens 360) are positioned between two-dimensional array 340 of pixels and eye 325 to direct light from two-dimensional array 340 of pixels.

Light from eye 325 (e.g., light reflected by a cornea, a retina, and/or a sclera of eye 325) is sent toward reflector 350. In some embodiments, light from eye 325 is sent toward reflector 350 through the one or more lenses (e.g., lens 360) positioned between two-dimensional array 340 of pixels and eye 325. In some embodiments, reflector 350 reflects the light from eye 325 toward optical sensor 380 (e.g., a camera). In some embodiments, reflector 350 transmits light from two-dimensional array 340 of pixels. Alternatively, reflector 350 reflects the light from two-dimensional array 340 of pixels and transmits light from eye 325 toward optical sensor 380. In some embodiments, lens 370 is positioned between reflector 350 optical sensor 380 to focus the light from reflector 350.

In FIG. 3A, reflector 350 is located on optical axis 344 (e.g., an optical axis defined by two-dimensional array 340 of pixels and/or lens 360). However, reflector 350 is tilted (e.g., by 30 degrees or more, such as 45 degrees) to steer the light from eye 325 to optical sensor 380. Light received by optical sensor 380 is used to determine a position of pupil 330 of eye 325 (e.g., a location and an angular position of pupil 330 of eye 325).

Display device 302 in FIG. 3B is similar to display device 300 in FIG. 3A, except that display device 302 includes mirror 390 to further steer the light from reflector 350.

However, the use of tilted reflector 350 as shown in FIGS. 3A and 3B is disadvantages, because, in some cases, tilted reflector 350 distorts the image of eye 325. In addition, a large reflector is required to cover the entire viewing area, which makes display device 300 heavy. When a large reflector cannot be used (e.g., due to the limitation on a size of display device 300), only a portion of the viewing area is covered with a small reflector, which provides a limited coverage of the eye (e.g., when an eye rolls beyond the area covered by the small reflector, the movement of the eye may not be tracked further).

Figure 4A:
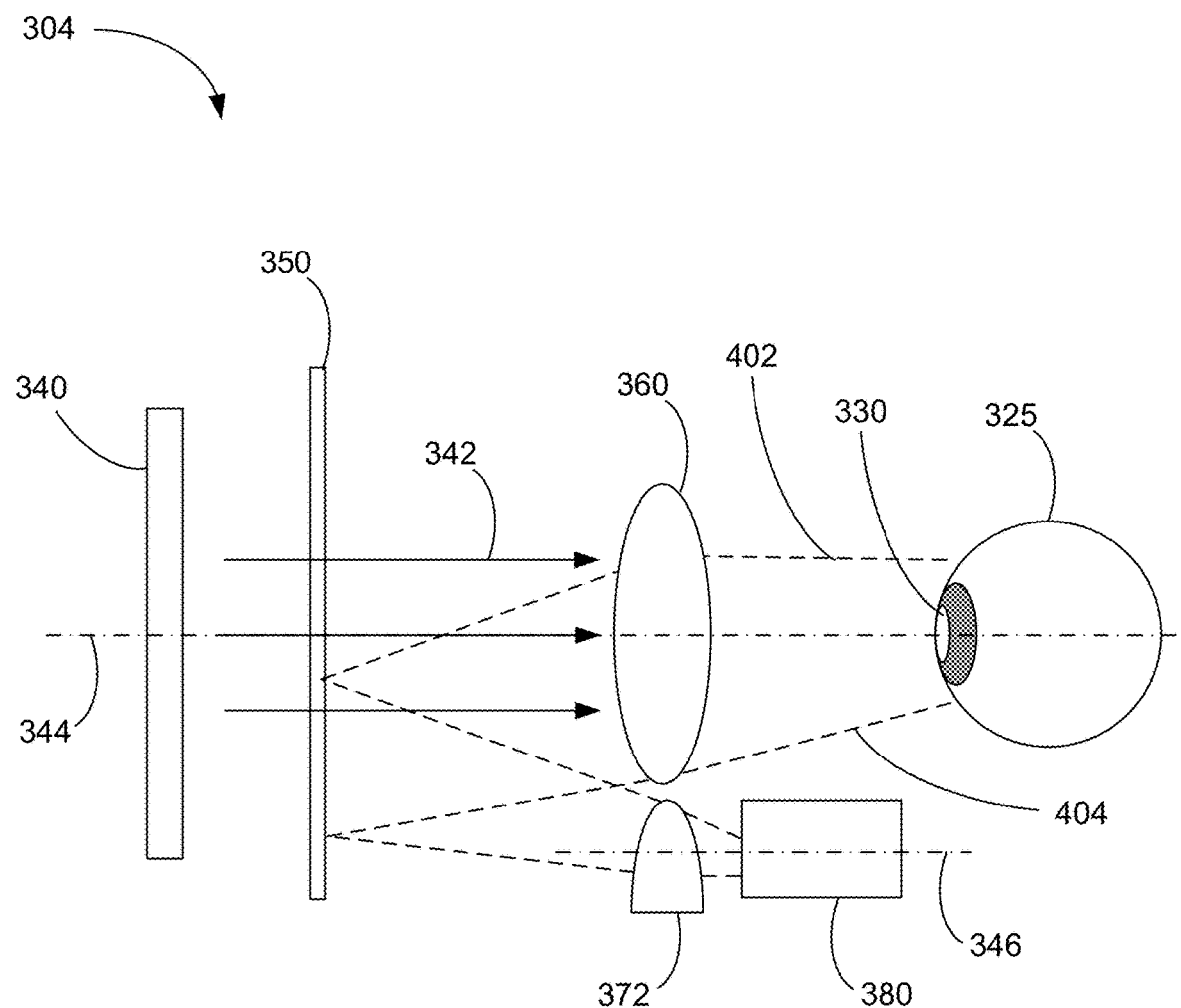
FIGS. 4A and 4B are schematic diagrams illustrating eye trackers in accordance with some embodiments.
Figure 4B:
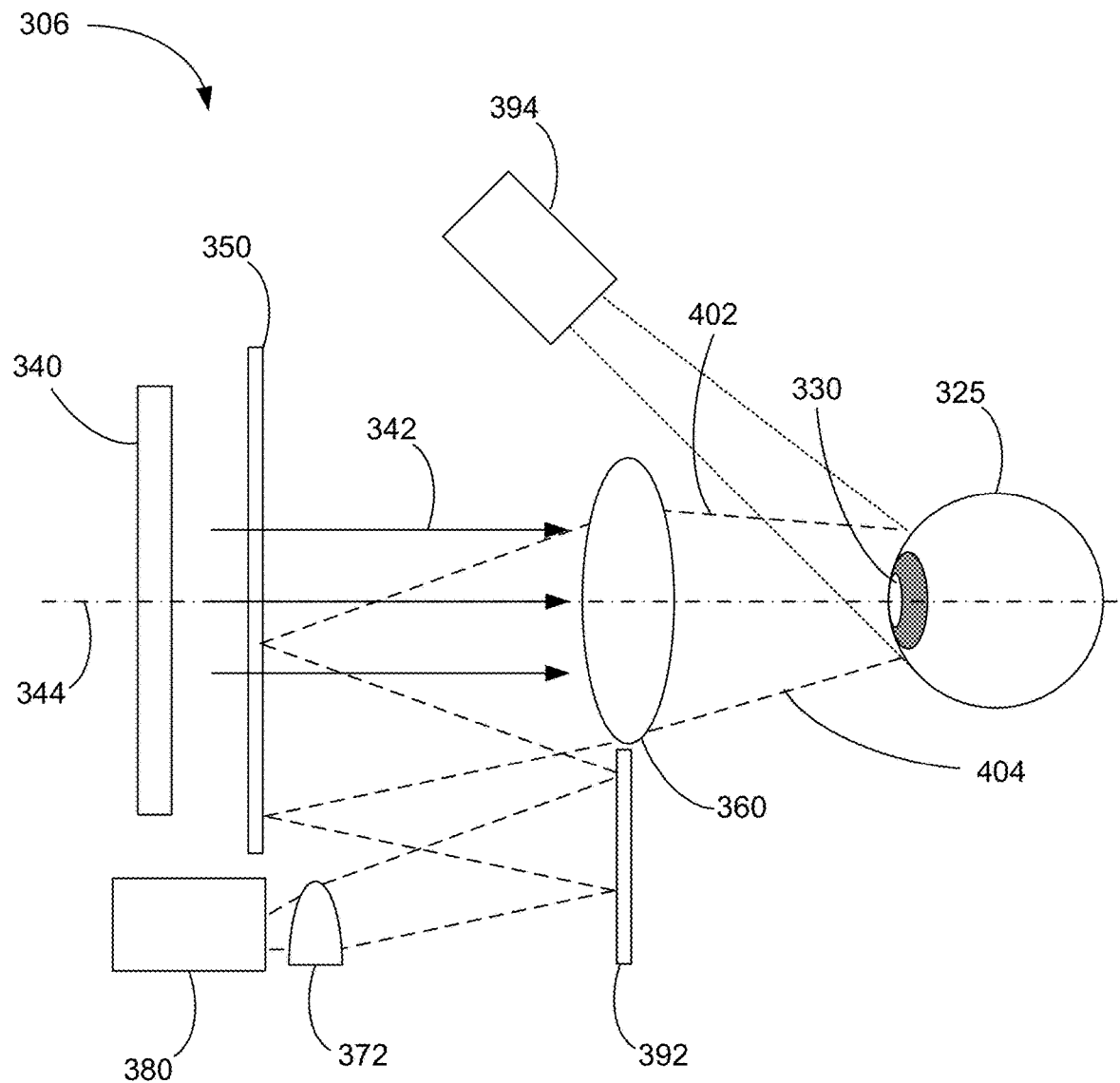

FIGS. 4A and 4B are schematic diagrams illustrating eye trackers in accordance with some embodiments.

FIG. 4A shows display device 304 with two-dimensional array 340 of pixels, reflector 350, lens 360, and optical sensor 380. However, reflector 350 is positioned perpendicular to optical axis 344 defined by two-dimensional array 340 of pixels and/or lens 360. This configuration allows optical sensor 380 to asymmetrically receive light. When optical sensor 380 is configured to collect an image of eye 325 off-axis as shown in FIG. 3A, in some cases, the image is distorted by off-axis aberrations in the optical system. Display device 304 includes lens 372 to reduce the distortion effect. In some embodiments, lens 372 is a non-symmetric lens (e.g., a half lens as shown in FIG. 4A). In some embodiments, lens 372 is an aspheric lens (e.g., a parabolic lens). In some embodiments, lens 372 defines optical axis 346 that is parallel to, and distinct from, optical axis 344. In some embodiments, the distortion effect is further reduced by image processing (e.g., a computational processing of the collected digital image to further reduce the distortion effect).

Thus, by utilizing an eye tracker with a reflector and a camera that is positioned off-axis, the size a head-mounted display device that includes the eye tracker is reduced. In addition, the challenges associated with using a large tilted reflector are obviated.

Display device 306 in FIG. 4B is similar to display device 304 in FIG. 4A, except that display device 306 includes mirror 392 to further steer the light from reflector 350. The use of mirror 392 further reduces a size of a display device. For example, display device 306 in FIG. 4B is smaller than display device 304 in FIG. 4A, partly because optical sensor 380 is located adjacent to two-dimensional array 340 of pixels (e.g., the optical path is folded by mirror 392).

Figure 5A:
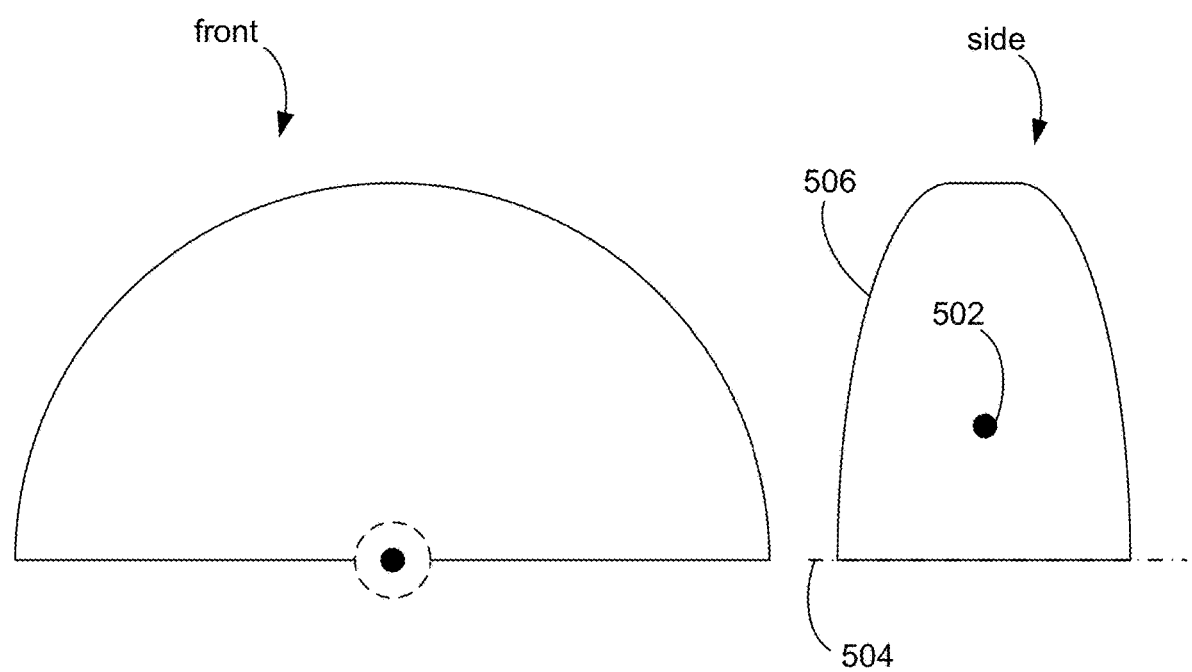
FIG. 5A illustrate front and side views of a lens in accordance with some embodiments.

FIG. 5A illustrate a front view and a side view of a lens (e.g., lens 372 shown in FIGS. 4A and 4B) in accordance with some embodiments. In FIG. 5A, the lens has an aperture that has a shape of a half circle. When a bottom half of the lens is not needed for the operation of display device 304 or 306, the bottom half of the lens is omitted. This reduces the size and the weight of a display device. In some embodiments, the lens is obtained by cutting a lens (e.g., a spherical or aspheric lens) with a circular aperture into half. In some embodiments, the lens is obtained by removing a portion of a lens with a circular aperture (e.g., cutting bottom one-third of the lens with the circular aperture).

The side view in FIG. 5A also shows that a geometric center of the lens (represented by point 502) is not located on an axis (represented by line 504) that passes through a center of a curvature of surface 506 of the lens and is parallel to an optical axis defined by a two-dimensional array of pixels.

Figure 5B:
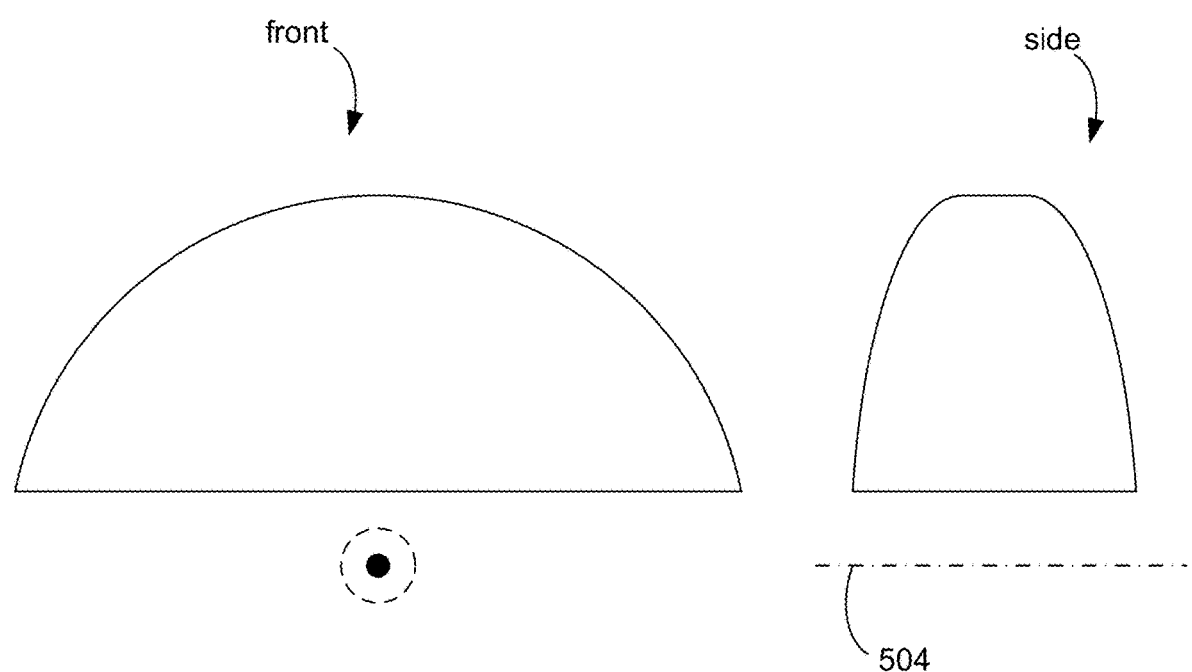
FIG. 5B illustrate front and side views of a lens in accordance with some embodiments.

FIG. 5B illustrates a front view and a side view of a lens (e.g., lens 372 shown in FIGS. 4A and 4B) in accordance with some other embodiments. In FIG. 5B, the lens is less than a half lens.

The side view in FIG. 5B also shows that an axis (represented by line 504) that is parallel to the optical axis defined by the two-dimensional array of pixels and passes through the center of the curvature of the surface of the lens is located outside the lens.

Certain embodiments based on these principles are described below.

In accordance with some embodiments, a display device includes a two-dimensional array of pixels configured for outputting a respective pattern of light (e.g., display device 304 in FIG. 4A). The two-dimensional array of pixels defines an optical axis (e.g., optical axis 344 in FIG. 4A). The display device also includes an eye tracker. The eye tracker includes a first reflector positioned to intersect the optical axis (e.g., reflector 350 intersects optical axis 344 in FIG. 4A); a first lens that is located off the optical axis (e.g., lens 372 is located off optical axis 344 in FIG. 4A); and an optical sensor configured to collect light, that is from the first reflector and has passed through the first lens, for determining a position of an eye of a user (e.g., in FIG. 4A, optical sensor 380 is configured to collect light from reflector 350 and passing through lens 372).

In some embodiments, the first reflector is positioned substantially perpendicular to the optical axis. For example, reflector 350 in FIG. 4A is positioned perpendicular to optical axis 344 (e.g., a surface normal of reflector 350 is parallel to, and/or overlaps with, optical axis 344). As used herein, the first reflector is deemed to be positioned substantially perpendicular to the optical axis when an angle formed by the optical axis and a surface normal of the first reflector is 30 degrees or less. In some cases, the angle formed by the optical axis and the surface normal of the first reflector is 20 degrees or less. In some cases, the angle formed by the optical axis and the surface normal of the first reflector is 10 degrees or less. In some cases, the angle formed by the optical axis and the surface normal of the first reflector is 5 degrees or less.

In some embodiments, the first lens is an aspheric lens. For example, the first lens has an aspheric surface (e.g., a parabolic surface).

In some embodiments, the first lens has an aperture that is not axisymmetric (e.g., the first lens has an aperture that is not a circle).

In some embodiments, the first lens is a half lens (e.g., lens 372 shown in FIG. 5A).

In some embodiments, a geometric center of the first lens is not located on an axis that passes through a center of a curvature of a surface of the first lens (e.g., FIG. 5A).

In some embodiments, the axis that is parallel to the optical axis defined by the two-dimensional array of pixels and passes through the center of the curvature of the surface of the first lens is located outside the first lens (e.g., FIG. 5B).

In some embodiments, the display device includes a light source configured to illuminate at least a portion of the eye of the user (e.g., light source 394, FIG. 4B).

In some embodiments, the light source is configured to emit infrared light.

In some embodiments, the first reflector is configured to reflect infrared light and transmit visible light (e.g., reflector 350 in FIG. 4B reflects infrared light scattered and/or reflected by eye 325 and transmits visible light from two-dimensional array 340 of pixels).

In some embodiments, the first reflector is configured to transmit infrared light and reflect visible light.

In some embodiments, a second lens for projecting the respective pattern of light on a retina of the eye of the user (e.g., lens 360 in FIG. 4A).

In some embodiments, the first reflector is located between the two-dimensional array of pixels and the second lens (e.g., in FIG. 4A, reflector 350 is located between two-dimensional array 340 of pixels and lens 360).

In some embodiments, the first reflector is spaced apart to allow both marginal rays 402 and 404 from the eye of the user, after reflection by the first reflector, to enter the first lens (e.g., in FIG. 4A, reflector 350 is spaced apart from lens 360 and lens 372 to allow marginal rays from eye 325, after reflection by reflector 350, to enter lens 372). If the first reflector is positioned too close to lens 360, at least a portion of the reflected light returns to lens 360. If the first reflector is positioned too close to lens 372, at least a portion of the reflected light misses lens 372.

In some embodiments, the optical sensor is a camera configured to collect an image of at least a portion of the eye. Alternatively, the optical sensor is a single element sensor configured to detect an intensity of light over only one element.

In some embodiments, the display device includes one or more processors configured to determine a position of an eye of a user from the collected light (e.g., processors 216). For example, the one or more processors process an intensity profile of light that has been retro-reflected by the eye of the user (e.g., by a retina of the eye of the user). In some embodiments, the one or more processors identify a location with a highest intensity in the intensity profile as a position of a pupil.

In some embodiments, the first reflector is a partial reflector. For example, the first reflector reflects a portion of light that impinges on the first reflector and transmits a portion of the light that impinges on the first reflector (e.g., the first reflector transmits 50% of light that impinges thereon and reflects 50% of the light that impinges thereon).

In some embodiments, a second reflector that is substantially parallel to the first reflector and configured to reflect light from the first reflector toward the first lens (e.g., in FIG. 4B, reflector 392 reflects light from reflector 350 toward lens 372). As used herein, the second reflector is deemed to be positioned substantially parallel to the first reflector when an angle between the first reflector and the second reflector is 30 degrees or less. In some cases, the angle formed by the first reflector and the second reflector is 20 degrees or less. In some cases, the angle formed by the first reflector and the second reflector is 10 degrees or less. In some cases, the angle formed by the first reflector and the second reflector is 5 degrees or less.

In accordance with some embodiments, a method is performed at a display device, comprising a two-dimensional array of pixels (e.g., two-dimensional array 340 of pixels) and an eye tracker. The eye tracker includes a lens that defines a first optical axis (e.g., optical axis 346 defined by lens 372 in FIG. 4A). The first optical axis is parallel to, and distinct from, a second optical axis defined by the two-dimensional array of pixels (e.g., optical axis 346 is distinct from optical axis 344 defined by two-dimensional array 344 of pixels). The method includes receiving light that is from the reflector and has passed through the lens (e.g., optical sensor 380 is used to receive light from reflector 350 and passing through lens 372); and determining a position of an eye of a user from the received light (e.g., based on an intensity profile of the retro-reflected light).

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A display device, comprising:
    a two-dimensional array of pixels configured for outputting a respective pattern of light, wherein the two-dimensional array of pixels defines a first optical axis; and
    an eye tracker that includes:
        a first reflector positioned to intersect the first optical axis, the first reflector being positioned perpendicular to the first optical axis;
        a first lens that defines a second optical axis that is parallel to the first optical axis and is located off the first optical axis for receiving light impinging on the first lens only in directions that are non-parallel to the second optical axis; and
        an optical sensor positioned parallel to the second optical axis and configured to collect light, that is from the first reflector and has passed through the first lens, for determining a position of a pupil of an eye of a user.

2. The display device of claim 1, wherein the first lens is an aspheric lens.

3. The display device of claim 1, wherein an aperture defined by the first lens is not axisymmetric.

4. The display device of claim 1, including:
    a light source configured to illuminate at least a portion of the eye of the user.

5. The display device of claim 4, wherein the light source is configured to emit infrared light.

6. The display device of claim 5, wherein the first reflector is configured to:
    reflect infrared light and transmit visible light; or
    transmit infrared light and reflect visible light.

7. The display device of claim 1, including:
    a second lens for projecting the respective pattern of light on a retina of the eye of the user.

8. The display device of claim 7, wherein the first reflector is located between the two-dimensional array of pixels and the second lens.

9. The display device of claim 1, wherein the optical sensor is a camera configured to collect an image of at least a portion of the eye.

10. The display device of claim 1, including:
    one or more processors configured to determine a position of an eye of a user from the collected light.

11. The display device of claim 1, wherein the first reflector is a partial reflector.

12. The display device of claim 1, including:
a second reflector that is substantially parallel to the first reflector and configured to reflect light from the first reflector toward the first lens.

13. A method, comprising:
using the display device of claim 1:
receiving light that is from the first reflector and has passed through the first lens; and
determining a position of a pupil of an eye of a user from the received light.

14. A non-transitory computer readable storage medium storing one or more programs for execution by one or more processors of the display device of claim 1,
wherein the one or more programs include instructions for:
receiving light that is from the reflector and has passed through the lens to the optical sensor; and
determining a position of a pupil of an eye of a user from an image-processed image corresponding to the received light.

15. The display device of claim 1, wherein the first lens is a convex-convex lens.

16. The display device of claim 1, wherein a geometric center of a first surface of the first lens, on which the light from the first reflector impinges, is located away from an axis that passes through a center of a curvature of the first surface of the first lens.

17. The display device of claim 16, wherein a geometric center of a principal plane of the first lens is not located on the axis that passes through the center of the curvature of the first surface of the first lens.

18. The display device of claim 16, wherein the axis passing through the center of the curvature of the first surface of the first lens is parallel to the first optical axis defined by the two-dimensional array of pixels and is located outside the first lens.

19. A display device, comprising:
a two-dimensional array of pixels configured for outputting a respective pattern of light, wherein the two-dimensional array of pixels defines a first optical axis; and
an eye tracker that includes:
a first reflector positioned to intersect the first optical axis, the first reflector being positioned substantially perpendicular to the first optical axis;
a first lens that defines a second optical axis that is parallel to the first optical axis and is located off the first optical axis for receiving light impinging on the first lens in a direction that is non-parallel to the second optical axis; and
an optical sensor configured to collect light, that is from the first reflector and has passed through the first lens, for determining a position of a pupil of an eye of a user, wherein:
an aperture of the first lens is not axisymmetric and the aperture of the first lens has a shape of a half circle.

* * * * *